United States Patent [19]
Akuta et al.

[11] Patent Number: 5,539,447
[45] Date of Patent: Jul. 23, 1996

[54] OPTICAL SCANNING UNIT AND IMAGE FORMING APPARATUS USING THE SAME WITH ROTATING LEVER ATTACHED TO A COVER FOR LIGHT EMISSION AND PREVENTION

[75] Inventors: Tomokazu Akuta; Yoji Houki; Takashi Maekawa; Akihiro Komuro; Mamoru Hokari, all of Kawasaki; Yasuhiro Ite, Inagi, all of Japan

[73] Assignee: Fujitsu Limited, Kawasaki, Japan

[21] Appl. No.: 104,017

[22] Filed: Aug. 10, 1993

[30] Foreign Application Priority Data

Sep. 28, 1992 [JP] Japan ................................. 4-257924
Sep. 28, 1992 [JP] Japan ................................. 4-257925

[51] Int. Cl.⁶ ........................... B41J 2/435; G11B 7/00
[52] U.S. Cl. ............................... 347/263; 347/245
[58] Field of Search ............................. 346/160, 108; 347/245, 263

[56] References Cited

U.S. PATENT DOCUMENTS

| | | | |
|---|---|---|---|
| 4,868,673 | 9/1989 | Negoro. | |
| 5,153,607 | 10/1992 | Ichinokawa | 347/263 |
| 5,157,416 | 10/1992 | Kinoshita et al. | 347/263 |
| 5,237,348 | 8/1993 | Blanding et al. | 347/263 |
| 5,247,316 | 9/1993 | Komori et al. | 347/138 |
| 5,270,737 | 12/1993 | Nakasugi et al. | 347/260 |

FOREIGN PATENT DOCUMENTS

0450643A2  9/1991  European Pat. Off..
61-165775  7/1986  Japan.

*Primary Examiner*—Benjamin R. Fuller
*Assistant Examiner*—Raquel Yvette Gordon
*Attorney, Agent, or Firm*—Staas & Halsey

[57] ABSTRACT

The present invention relates to an optical scanning unit used for exposing a photosensitive drum of an image forming apparatus to light, and an image forming apparatus using this optical scanning unit. This optical scanning unit comprises a light source; an optical scanning mechanism for scanning with light from the light source; a start detecting mechanism for detecting scan light of the optical scanning mechanism at an end portion of a scanning range of the scan light to detect beginning of light scanning; and a frame which has a higher rigidity than that of a frame of an image forming apparatus and to which the light source, the optical scanning mechanism and the start detecting mechanism are attached. The image forming apparatus comprises an endless photosensitive body; charging unit for charging the photosensitive body; an optical scanning unit for exposing the photosensitive body to light, including a light source, an optical scanning mechanism having the same structure as the aforementioned optical scanning unit; a developing unit for developing an electrostatic latent image formed on the photosensitive body by light exposure by the optical scanning unit; and a transfer unit for transferring a toner image on the photosensitive body onto a sheet. Alteration of the optical path of the optical scanning unit by external force applied is made smaller by making the frame of the optical scanning unit more rigid than that of the image forming apparatus.

14 Claims, 15 Drawing Sheets

OPTICAL SCANNING UNIT AND IMAGE FORMING APPARATUS USING THE SAME WITH ROTATING LEVER ATTACHED TO A COVER FOR LIGHT EMISSION AND PREVENTION

BACKGROUND OF THE INVENTION

1. Field of the Invention

The present invention relates to an optical scanning unit which is used for image exposure or the like of an electrophotographing apparatus, and an image forming apparatus using this optical scanning unit. More particularly, this invention relates to an optical scanning unit which performs optical scanning with light from a light source by using of an optical scanning mechanism to irradiate the light on a photosensitive body, and an image forming apparatus using this optical scanning unit.

2. Description of the Related Art

Image forming apparatuses, such as a copying machine, a printer and a facsimile, employ a latent image forming type recording apparatus like an electrophotographing apparatus, due to a recent demand for image recording on normal sheets of paper. According to this image forming principle, after a photosensitive drum as a latent image carrier is precharged, the photosensitive drum is exposed to a light image to have an electrostatic latent image formed thereon. This electrostatic latent image is developed by a developing unit so that a toner image is formed on the photosensitive drum. This toner image is then transferred onto a sheet of paper.

This image forming apparatus performs image exposure line by line. This is accomplished by an optical scanning unit which uses a semiconductor laser device or the like as a light source and causes an optical scanning mechanism to scan with the light from the light source to irradiate that light on a photosensitive drum.

It is desirable that the light path in the optical scanning unit is not altered by external force applied.

FIG. 1 is an explanatory diagram of prior art. In an optical scanning unit 9, light from a semiconductor laser device 920 is transformed into parallel light by a collimator lens 921 and is focused by a cylindrical lens 922 to be irradiated on a polygon mirror 923 that is rotating. After this light is optically scanned by the polygon mirror 923, it is focused by a focus lens 925 and is directed downward by a reflector 926. The downward-directed light is guided by a reflector 927 to a focus lens 928 from which the light is irradiated on a photosensitive drum 90. As the semiconductor laser device 920 is driven by an image signal to be written on the photosensitive drum 90, an image corresponding to the image signal is written on the photosensitive drum 90 by Optical scanning.

At this time, the beginning of optical scanning should by synchronized with the image signal. To detect the beginning of the optical scanning, a start detecting unit is provided to detect the end portion (leading) of the scan light from the focus lens 928. In this example, a reflector 929 is provided at the position corresponding to the end of the scan light, so that the leading portion of the scan light is guided by the reflector 929 to a start detector 930, which generates an optical scan start signal.

This optical scanning unit 9 is normally mounted on the frame of the image forming apparatus. According to the prior art, the optical scanning unit 9 is secured to the apparatus' frame by screws or the like. This method causes deformation in the optical scanning unit 9 by the external force applied when the optical scanning unit 9 is attached to the apparatus' from or external force due to the tilting of the apparatus, thereby altering the optical path. This makes the aforementioned start detection difficult. This problem has been overcome by, for example, a method of adjusting the position of the start detecting mechanism 929, 930 after the optical scanning unit 9 is mounted to the apparatus' frame.

Since the prior art should adjust the start detecting mechanism after the attachment of the optical scanning unit 9 to the apparatus, therefore, the adjustment cannot be accomplished by the optical scanning unit alone. In other words, it takes time and labor to adjust the optical scanning unit 9 mounted on the electrophotographing apparatus. Further, the alteration of the optical path also changes the optical path on the irradiated surface of the photosensitive drum. Therefore, an error which does not matter in an electrophotographing apparatus of a low resolution would matter in a high-resolution electrophotographing apparatus. For instance, the error would result in the fluctuation of the vertical print lines in such an electrophotographing apparatus.

SUMMARY OF THE INVENTION

It is therefore a primary object of the present invention to provide an optical scanning unit which is designed to minimize deformation on the optical scanning unit caused by external force applied through an apparatus' frame, and an image forming apparatus using this optical scanning unit.

It is another object of the present invention to provide an optical scanning unit which is designed to minimize alteration of the optical path of the optical scanning unit caused by external force applied through an apparatus' frame, and an image forming apparatus using this optical scanning unit.

It is a further object of the present invention to provide an optical scanning unit which is designed to minimize deformation on the optical scanning unit caused by external force applied when attached to an apparatus' frame, and an image forming apparatus using this optical scanning unit.

It is a still further object of the present invention to provide an optical scanning unit which shields scan light when an apparatus' cover is open, and an image forming apparatus using this optical scanning unit.

To achieve the foregoing objects, according to one aspect of the present invention, there is provided an optical scanning unit comprising a light source; an optical scanning mechanism for scanning with light from the light source; a start detecting mechanism for detecting scan light of the optical scanning mechanism at an end portion of a scanning range of the scan light to detect beginning of light scanning; and a frame which has a higher rigidity than that of a from of an image forming apparatus and to which the light source, the optical scanning mechanism and the start detecting mechanism are attached.

According to another aspect of the present invention, there is provided an image forming apparatus comprising an endless photosensitive body; charging means for charging the photosensitive body; an optical scanning unit for exposing the photosensitive body to light, including a light source, an optical scanning mechanism for scanning with light from the light source, a start detecting mechanism for detecting scan light of the optical scanning mechanism at an end portion of a scanning range of the scan light to detect beginning of light scanning, and a frame which has a higher rigidity than that of a frame of the image forming apparatus and to which the light source, the optical scanning mechanism and the start detecting mechanism are attached; a developing unit for developing an electrostatic latent image formed on the photosensitive body by light exposure by the optical scanning unit; and a transfer unit for transferring a toner image on the photosensitive body onto a sheet.

According to the present invention, the rigidity of the frame of the optical scanning unit is made higher than that of the frame of the apparatus to which the optical scanning unit is attached. It is therefore possible to prevent the optical scanning unit from deforming when the optical scanning unit is attached to the apparatus' frame. Further, even external force, such as torsion, is applied to the body of the apparatus so that the optical scanning unit receives force to deform the frame of the optical scanning unit, the frame of the optical scanning unit having a higher rigidity has less deformation than the body of the apparatus. The amount of deformation of the optical scanning unit by such external force is reduced, thus reducing alteration of the optical path.

Other features and advantages of the present invention will become readily apparent from the following description taken in conjunction with the accompanying drawings.

BRIEF DESCRIPTION OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
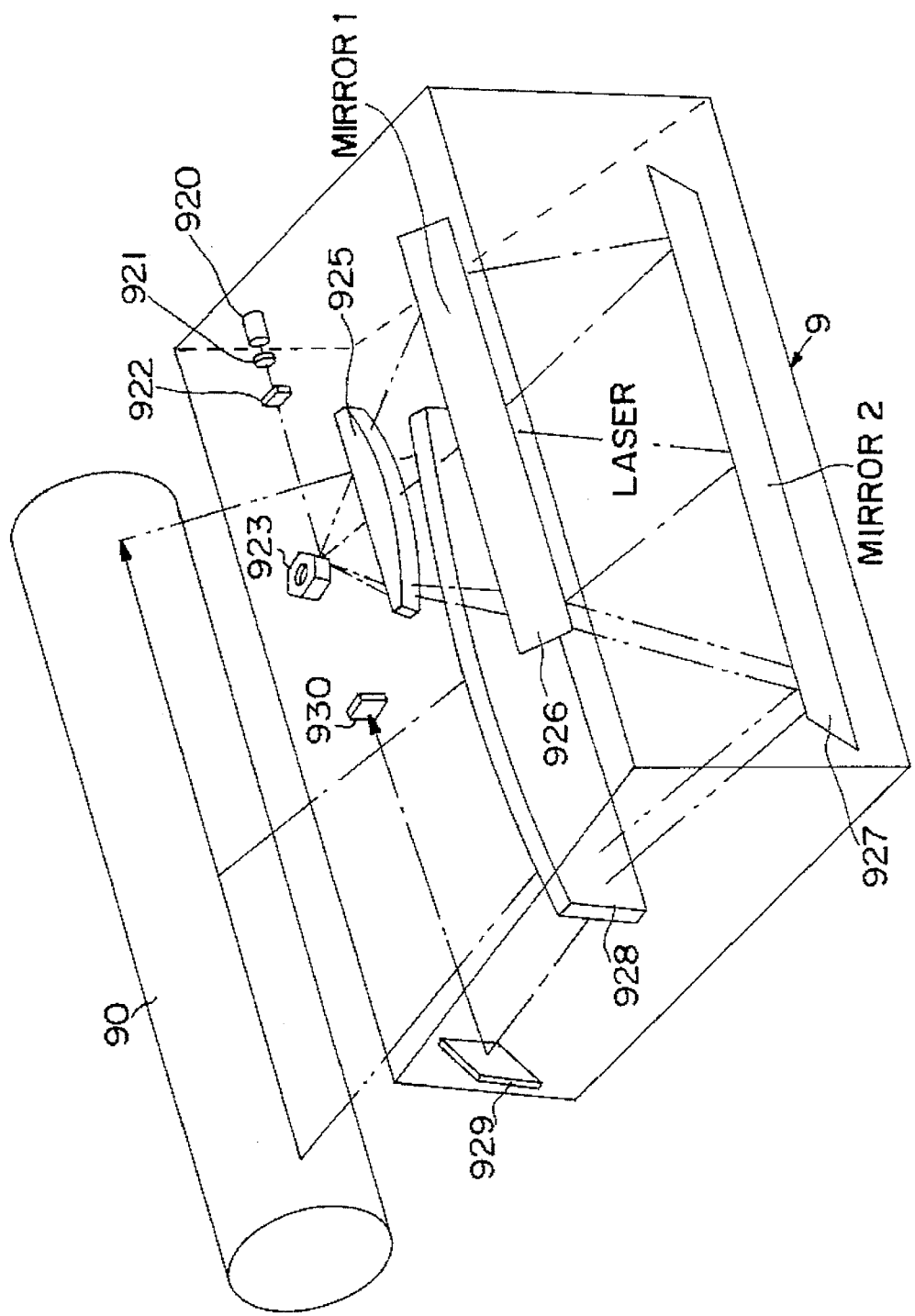
FIG. 1 is a diagram showing prior art.
Figure 2:
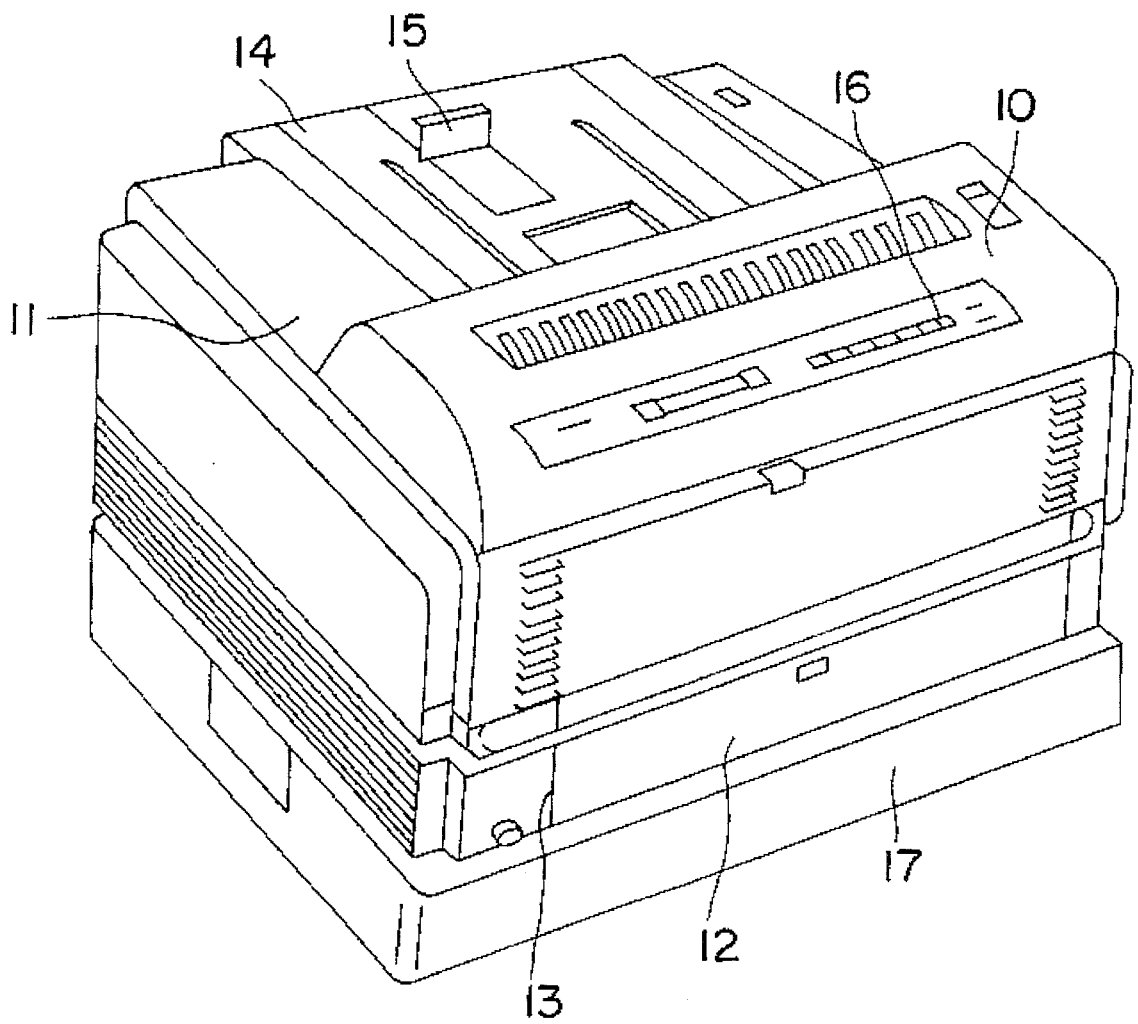
FIG. 2 is a perspective view showing the outline of an image forming apparatus according to one embodiment of the present invention.
Figure 3:
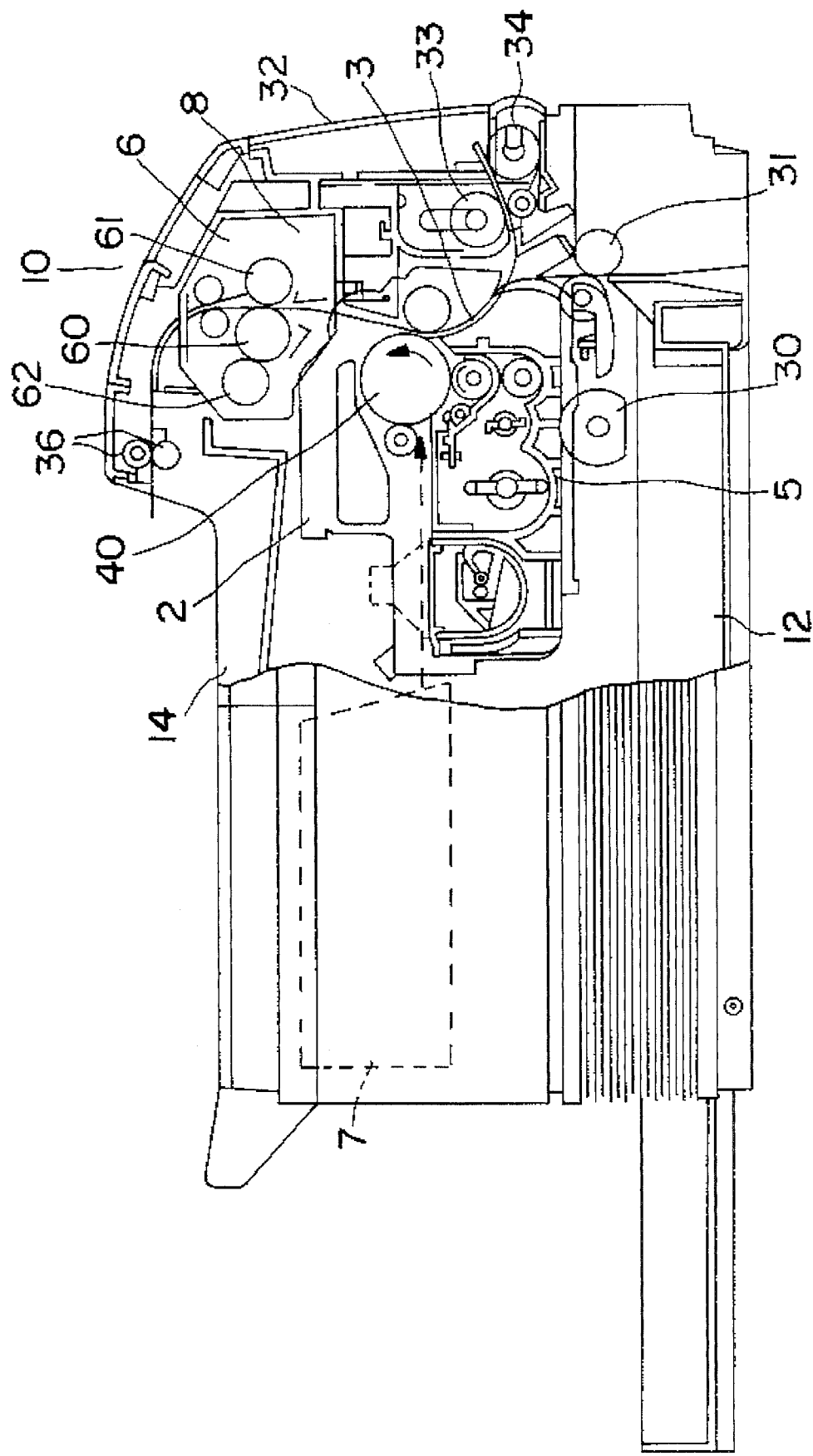
FIG. 3 is a cross-sectional view showing the interior of the image forming apparatus shown in FIG. 2.
Figure 4:
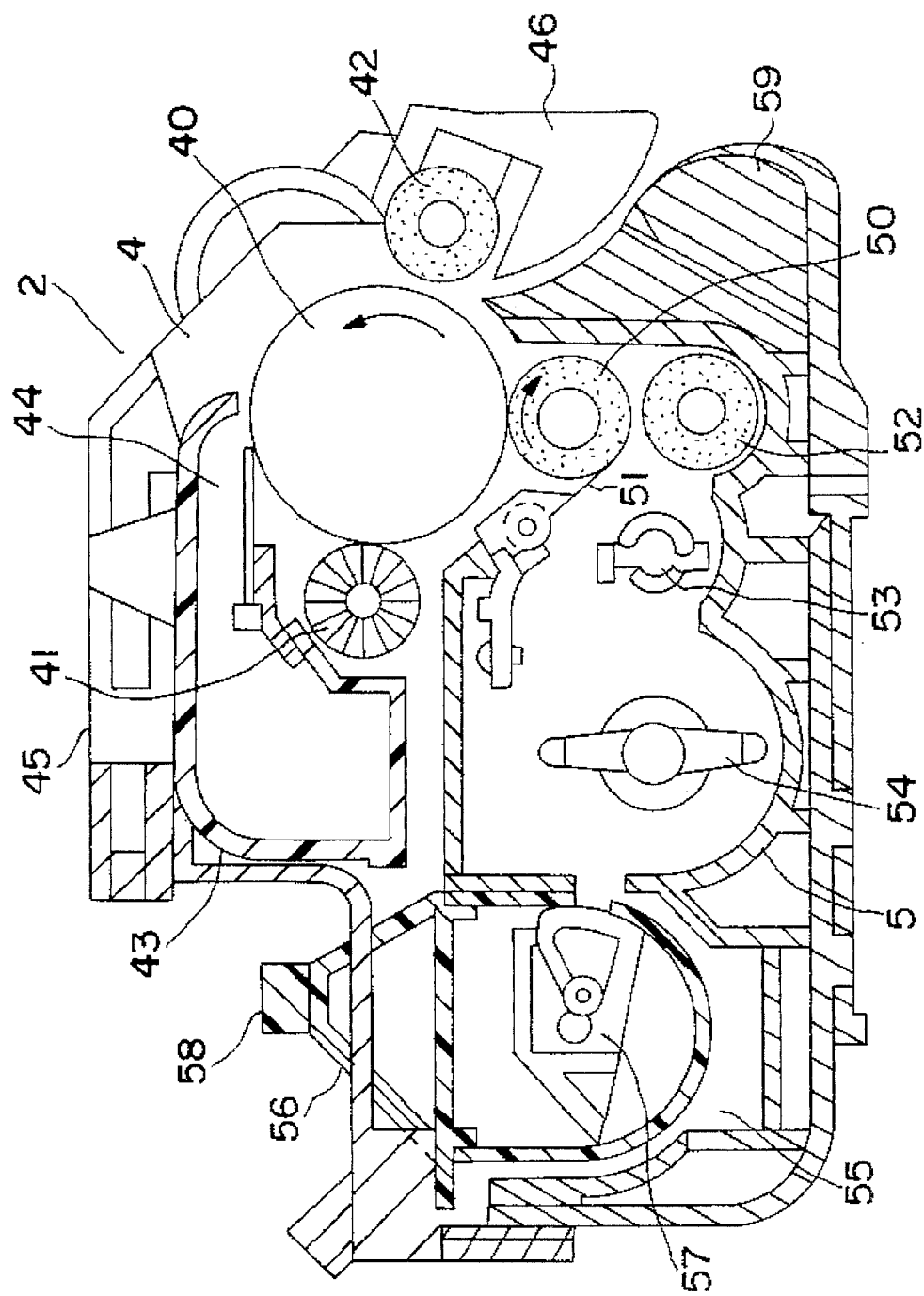
FIG. 4 is a cross section of a process cartridge of the image forming apparatus shown in FIG. 3.
Figure 5:
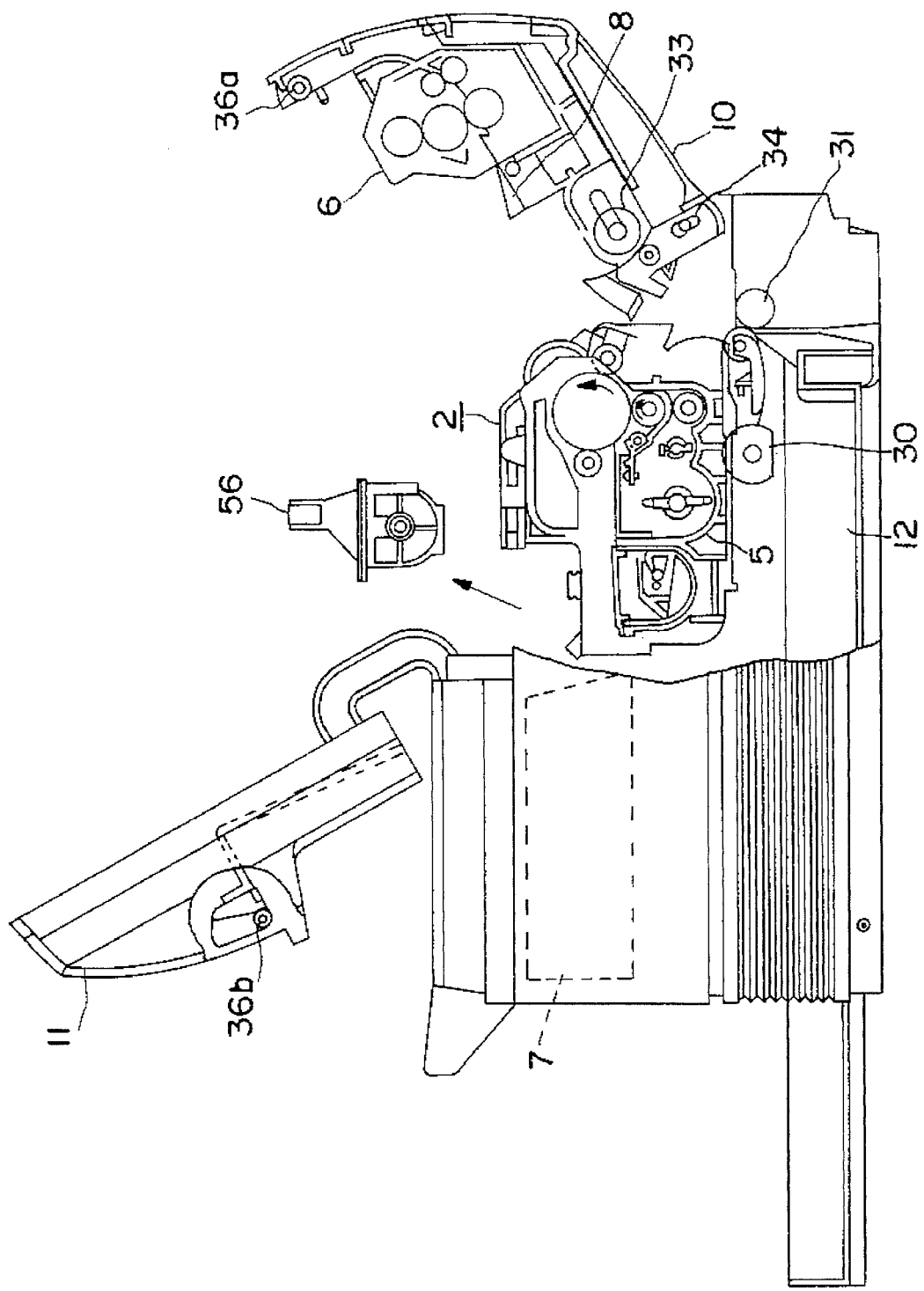
FIG. 5 is a diagram illustrating the image forming apparatus in FIG. 3 with its covers open.
Figure 6A:
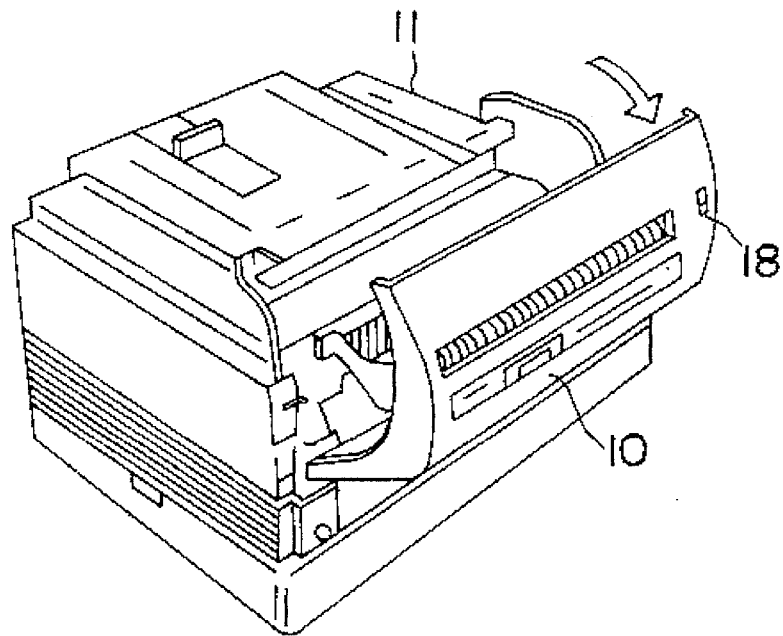
FIGS. 6A and 6B are diagrams illustrating the image forming apparatus shown in FIG. 2 with the covers open.
Figure 6B:
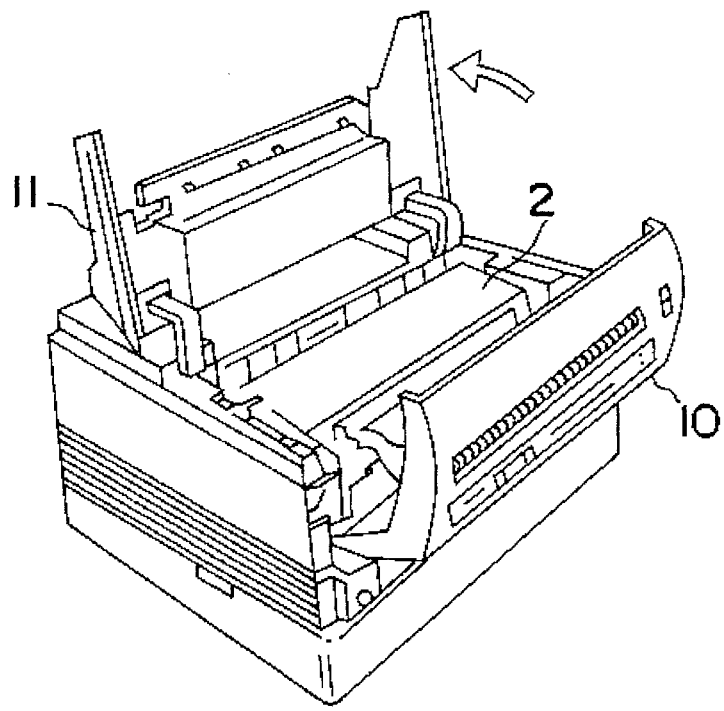

FIG. 2 is a perspective view showing the outline of an image forming apparatus according to one embodiment of the present invention, FIG. 3 is a cross-sectional view showing the interior of the image forming apparatus shown in FIG. 2, FIG. 4 presents a cross section of a process cartridge shown in FIG. 3, FIG. 5 illustrates the image forming apparatus in FIG. 3 with its covers open, FIG. 6A is a perspective view of the image forming apparatus with its front cover open, and FIG. 6B is a perspective view of the image forming apparatus with its upper cover open.

The illustrated image forming apparatus is an electrophotographic printer; FIG. 2 is a perspective view of the apparatus as viewed from the front. In FIG. 2, a front cover 10 is opened frontward of the apparatus to open a feeding path 3 shown in FIG. 3. An upper cover 11 covers the top of the apparatus, and is opened upward of the apparatus. When opened, the upper cover 11 opens the top of the apparatus. A sheet cassette 12 is to be set in the apparatus from the front thereof through a cassette inserting port 13. A stacker 14 is provided at the top of the apparatus to receive printed sheets. A sheet guide 15 is provided on the stacker 14 to guide the sheet discharged on the stacker. An operation panel 16 is provided at a front cover 10 and has various switches and a display device. A controller box 17 is provided at the bottom of the apparatus and accommodates printer control circuits, etc.

Referring to the cross-sectional view in FIG. 3, an electrophotographic process cartridge 2 is provided above the sheet cassette 12 and will be described later with reference to FIG. 4. A thermal fixing unit 6 causes a sheet to be put through between a heat roller 60 and a backup roller 61 to fix a toner image on that sheet. This thermal fixing unit 6 is provided with a cleaning roller 62 for removing a toner from the heat roller 60. An optical scanning unit 7 uses a polygon mirror to scan the photosensitive drum 40 with a beam from a semiconductor laser, which is driven according to image information, thereby writing an image on the photosensitive drum 40. The optical scanning unit 7 will be described in detail referring to FIGS. 7 through 16. The light image from the optical scanning unit 7 passes above a developing unit 5 (which will be described referring to FIG. 4) of the process cartridge 2 as indicated by a broken-lined arrow to irradiate the photosensitive drum 40 of the process cartridge 2. A sheet separator 8 has a discharge electrode to apply charges of the opposite polarity to that of the potential at the back of the sheet on which the toner image on the photosensitive drum 40 has been transferred, to that back of the sheet to deelectrify the back of the sheet. This discharge electrode deelectrifies the back of the sheet to separate the sheet from the photosensitive drum 40.

A pickup roller 30 serves to pick up sheets in the sheet cassette 12. A resist roller 31 aligns the leading edge of the sheet picked up by the pickup roller 30, and feeds out the sheet. Reference numeral "32" denotes a manual-insertion guide which guides a manually inserted sheet to a feed roller 33 when opened rightward in FIG. 4. The feed roller 33 feeds the sheet, guided by the manual-insertion guide 32, toward the photosensitive drum 40 of the process cartridge 2. Reference numeral "34" is the rotary shaft of the front cover 10. Discharge rollers 36 are provided at the top portion of the front cover 10 to discharge the sheet, passing through the thermal fixing unit 6, onto the stacker 14.

As shown in the cross-section view in FIG. 4, the process cartridge 2 comprises a drum cartridge 4 and the developing unit 5. The developing unit 5 is attached to the drum cartridge 4 by pins (not shown), and can be separated therefrom by detaching the pins.

The structure of the drum cartridge 4 will now be described. In FIG. 4, the photosensitive drum 40 has an organic photosensitive layer (OPC or the like) formed on the surface of a cylindrical base of aluminum or the like, and is rotatable counterclockwise as shown. A brush charger 41 is constituted by winding a conductive brush, which has conductive rayon fibers woven into the core, around the rotary shaft. The photosensitive drum 40 is uniformly charged to about −600 V by this brush charger 41. A transfer roller 42 is provided at the drum cartridge 4, and is made of a conductive porous rubber material, such as porous polyurethane foam (sponge). This transfer roller 42 is applied with a transfer voltage and is pressed against the photosensitive drum 40 to transfer the toner image on the photosensitive drum 40 onto the sheet. A waste toner box 43 is provided with a scraping blade 44, which scrapes the residue toner off the photosensitive drum 40, so that the box 43 receives the scraped toner. A handle 45 is provided to permit a user to carrying the drum cartridge 4 with a hand. A roller cover 46 serves to be a stopper for the transfer roller 42 and to protect the transfer roller.

The structure of the developing unit 5 will be described next. Referring to FIG. 4, a developing roller 50 is a conductive elastic roller, which is preferably made of a conductive porous rubber material, such as conductive porous polyurethane foam (sponge). The developing roller 50 rotates clockwise as shown in the diagram to feed a non-magnetic, one-component toner to the photosensitive drum 40 while holding the toner with the retentive force of its surface. This developing roller 50 is pressed against the photosensitive drum 50 with a predetermined nip width and is applied with a developing bias voltage of about −300 V. A layer-thickness restricting blade 51, which is made of a 0.1-mm thick stainless plate, serves to restrict the thickness of the toner layer on the developing roller 50 to a predetermined thickness. This layer-thickness restricting blade 51 is pressed against the developing roller 50 and is applied with a negative voltage of about −400 V. This applied voltage allows the layer-thickness restricting blade 51 to supply negative charges to the toner to forcibly charge the toner negatively at the time of restricting the thickness of the toner layer. Accordingly, the toner can be charged stably even under the conditions of high humidity and high temperature. A reset roller 52 is disposed to face the developing roller 50 and rotates in the same direction as the developing roller 50. This reset roller 52 is applied with a bias voltage of −400 V to scrape the toner off the developing roller 50 in the right-hand side of the diagram and supply the toner to the developing roller 50 in the left-hand side of the diagram.

Reference numerals "53" and "54" denote paddle rollers, which rotate to stir the non-magnetic, one-component toner in the developing unit 5 and charge the toner. In addition, the paddle rollers 53 and 54 supply the stirred toner toward the reset roller 52. A toner cassette retainer 55 retains a toner cassette 56, which contains the non-magnetic, one-component toner. This toner cassette 56 is detachably set in the toner cassette retainer 55. A toner supply lever 57 is provided in the toner cassette 56, and rotates to feed the toner in the toner cassette 56 into the developing unit 5. The toner cassette 56 is provided with a handle 58 to allow a user to hold the toner cassette 56 with a hand. A sheet guide rib 59 is provided below the roller cover 46. This sheet guide rib 59, together with the roller cover 46, forms a path for guiding the sheet between the photosensitive drum 40 and the transfer roller 42.

A U-shaped feeding path 3 is formed, which extends from the sheet cassette 12 and reaches the discharge rollers 36 through the process cartridge 2.

The function of this printer will be described referring to FIGS. 2 through 4. A sheet in the sheet cassette 12 is picked up by the pickup roller 30 and abuts against the resist roller 31. After the leading edge is aligned by the resist roller 31, this sheet is fed toward the photosensitive drum 40 along a U-shaped feeding path 3. Meantime, when the picked sheet reaches the resist roller 31, the optical scanning unit 7 starts exposing the photosensitive drum 40 to image light. As a result, the potential of the image-exposed portion of the photosensitive drum 40, which has been charged to −600 V by the brush charger 41 becomes zero, thus forming an electrostatic latent image corresponding to the image to be copied.

As a bias voltage of −300 V is applied to the developing roller 50 in the developing unit 5, the negatively charged toner sticks on the image-exposed portion of zero potential of the photosensitive drum 40, forming a toner image thereon. The toner image on the photosensitive drum 40 is transferred onto the sheet, fed by the resist roller 31, by the transfer roller 42 due to the electrostatic force and pressure. The back of the sheet that is electrostatically adsorbed to the photosensitive drum 40 is deelectrified by the charges supplied by the sheet separator 8, so that this sheet is separated from the photosensitive drum 40. The separated sheet is fed to the thermal fixing unit 6 where the toner image on the sheet is thermally fixed by the heat roller 60. The image-fixed sheet is then discharged on the stacker 14 by the discharge rollers 36.

A sheet manually inserted through the manual-insertion guide 32 pulled open is likewise conveyed toward the photosensitive drum 40 by the feed roller 33. The toner image on the photosensitive drum 40 is transferred onto that sheet by the transfer roller 42 due to the electrostatic force and pressure. The back of the sheet that is electrostatically adsorbed to the photosensitive drum 40 is deelectrified by the charges supplied by the sheet separator 8, so that this sheet is separated from the photosensitive drum 40. The separated sheet is then fed to the thermal fixing unit 6 where the toner image on the sheet is thermally fixed by the heat roller 60. The resultant sheet is then discharged on the stacker 14 by the discharge rollers 36.

In the diagram of FIG. 5 which illustrates the front cover and upper cover of the apparatus opened, the front cover 10 is opened frontward (rightward in the diagram) around the cover rotary shaft 34. Provided on this front cover 10 are the manual-insertion guide 32, the feed roller 33, the sheet separator 8, the thermal fixing unit 6 and an upper discharge (drive) roller 36a of the discharge roller pair 36. The upper cover 11 is opened upward of the apparatus (upward in the diagram) around a rotary shaft (not shown). A lower discharge (pinch) roller 36b of the discharge roller pair 36 is provided on the upper cover 11.

When the front cover 10 is opened by unlocking a lock lever 18 of the front cover 10, as shown in FIGS. 5 and 6A, the U-shaped feeding path 3 extending from the resist roller 31 to the discharge rollers 36 is opened, making it easier to remove any jammed sheet. If the transfer roller 42 is shifted from the proper position facing the photosensitive drum 40, i.e., if there is a shift in parallelism and position to the photosensitive drum 40, image transfer cannot be executed properly. In this respect, the transfer roller 42 is provided on the process cartridge 2. Although this design does not open the space between the photosensitive drum 40 and the transfer roller 42, a jammed sheet can easily be removed without any problem even if that portion does not become free.

The reason why the whole thermal fixing unit 6 is provided on the front cover 10 is that if the thermal fixing unit 6 were divided to open the feeding path, a part of the thermal fixing unit should be provided on the process cartridge 2, thus inconveniencing a user to remove the process cartridge 2. Although this design does not open the space between the heat roller 60 of the thermal fixing unit 6 and the backup roller 61, a jammed sheet can easily be removed without any problem even if that portion does not become free.

The front cover 10 is provided above the upper cover 11 at the sheet discharging portion so that the upper cover 11 does not become free unless the front cover 10 is opened as shown in FIG. 2. When the front cover 10 is opened and the upper cover 11 is opened next as shown in FIG. 6B, therefore, the top portion of the apparatus and part of the front portion of the apparatus are opened as shown in FIG. 5. Accordingly, the toner cassette 56 can easily be removed or attached from the front side of the apparatus while keeping the process cartridge 2 installed in the apparatus, thus allowing for the exchange of the toner cassette 56 alone.

As the front side of the apparatus is opened by opening the front cover 10 and the top portion of the apparatus is opened by opening the upper cover 11 as shown in FIG. 5, the attachment and detachment of the process cartridge 2 can also be performed easily. Even if the process cartridge 2 is large, therefore, the exchange of the process cartridge 2 is easy. In other words, the process cartridge 2 can be designed large, particularly, the developing unit 5 in the process cartridge 2 can be designed large, so that the quantity of the retainable developer can be increased, thus making the exchanging cycle of the developing unit 5 significantly long.

Further, since the developer can be supplemented through the exchange of the toner cassette 56 alone, the exchanging cycle of the developing unit 5 can be made longer. Furthermore, as the covers 10 and 11 are opened with the discharge rollers 36 separated into upper and lower rollers, the entire U-shaped feeding path 3 can be opened, thus facilitating removal of a jammed sheet.

Figure 7:
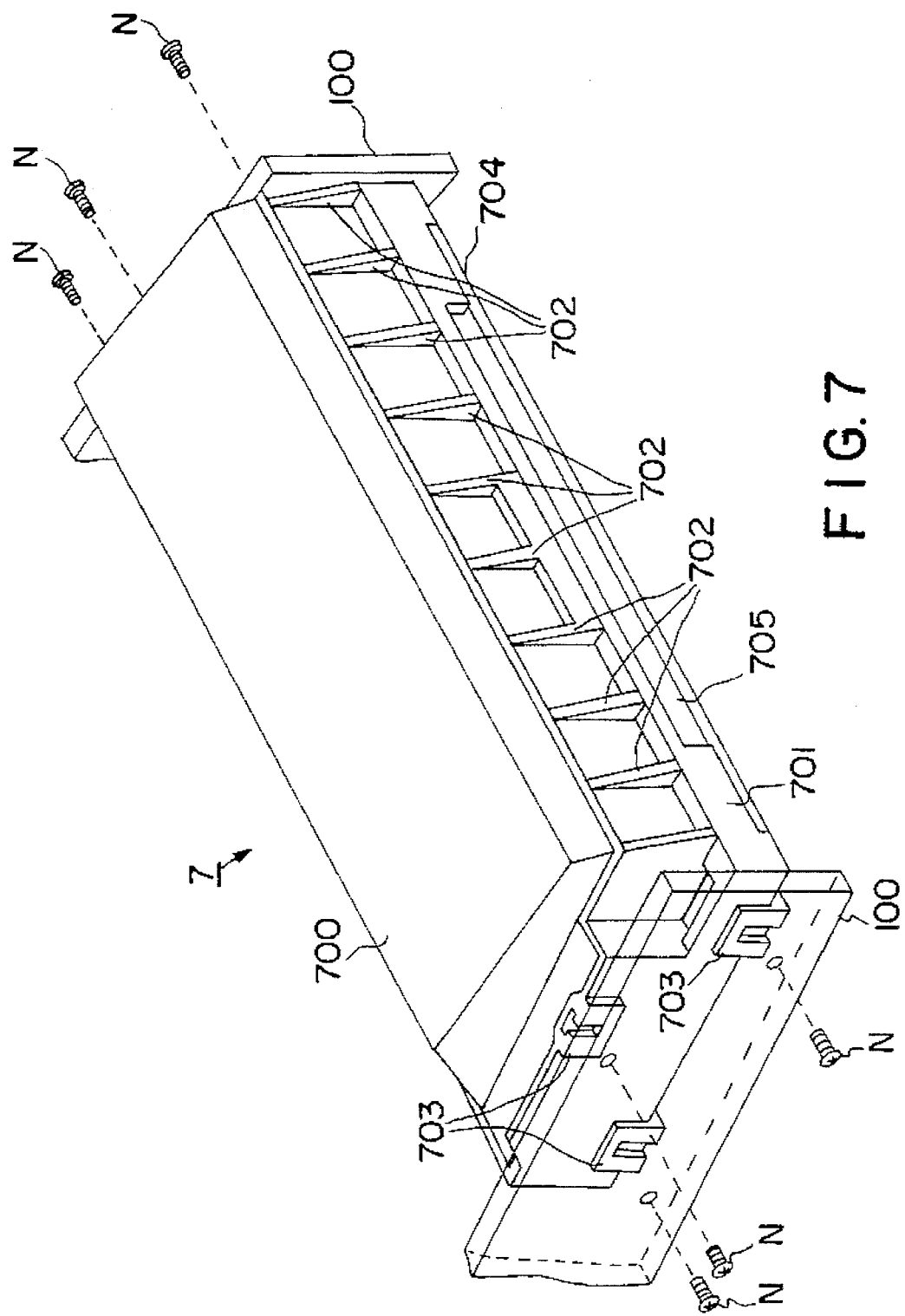
FIG. 7 is a perspective view of an optical scanning unit.
Figure 8:
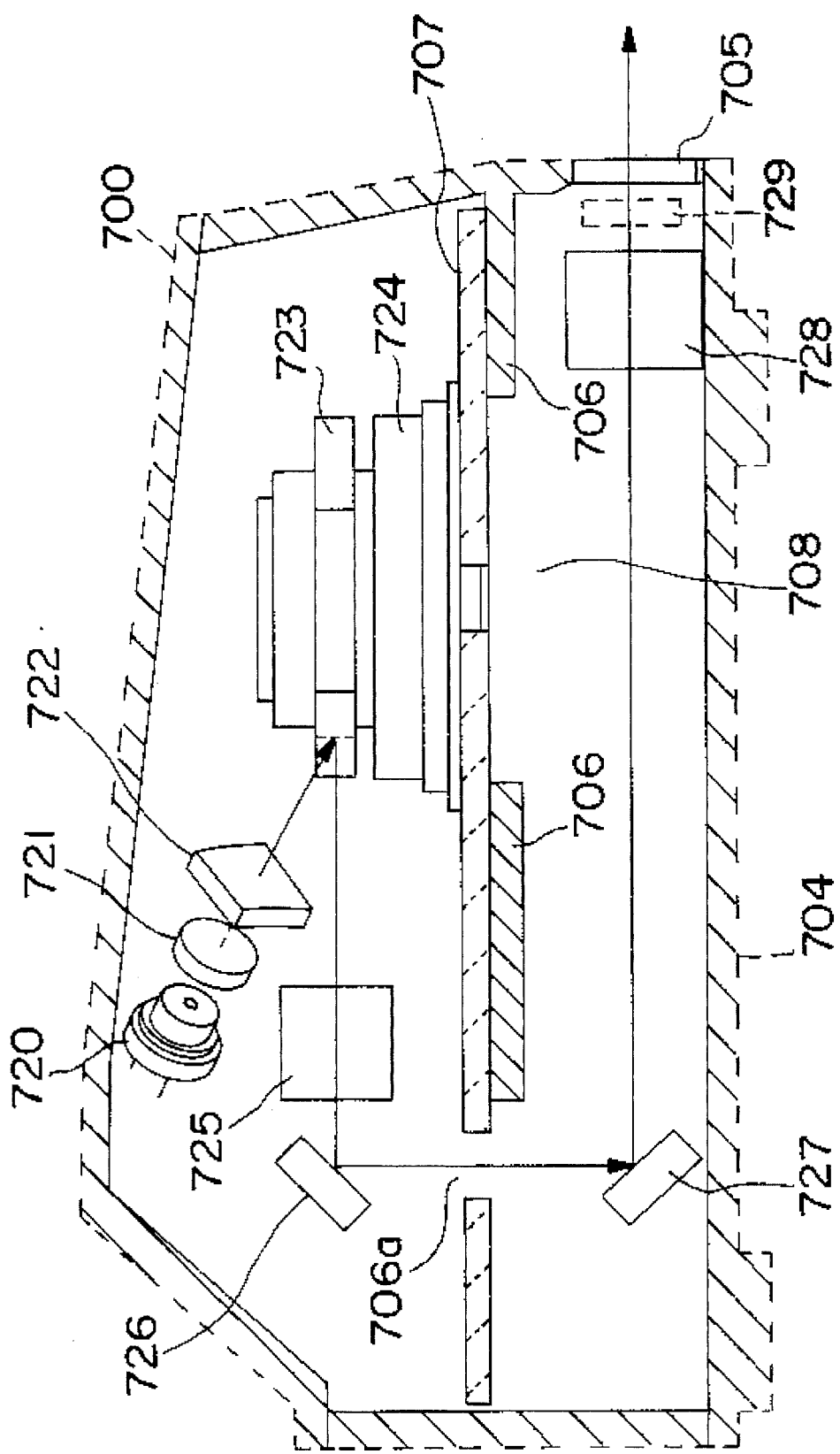
FIG. 8 is a cross section of the optical scanning unit in FIG. 7.
Figure 9:
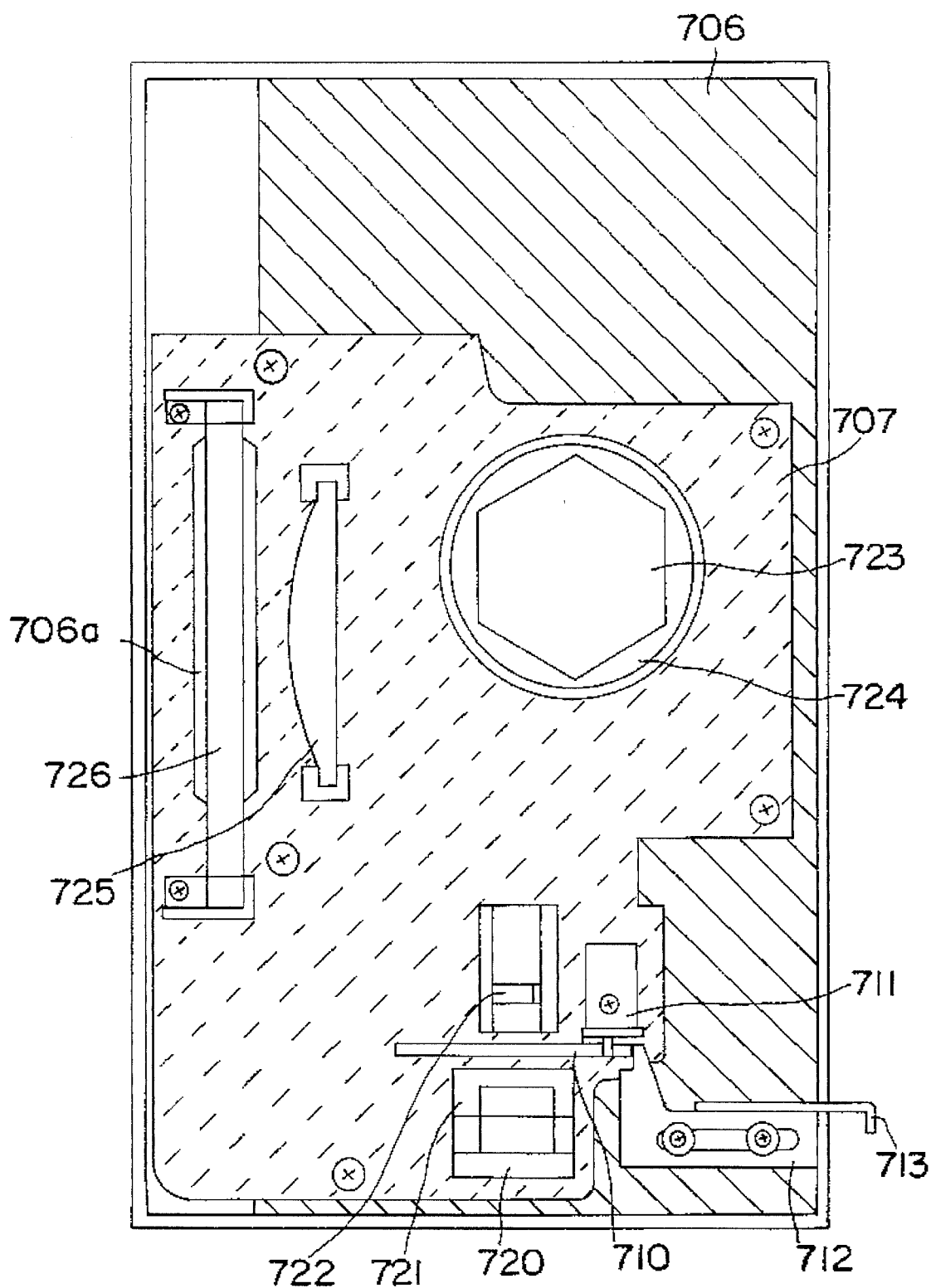
FIG. 9 is a top view showing the interior of the optical scanning unit in FIG. 7.
Figure 10:
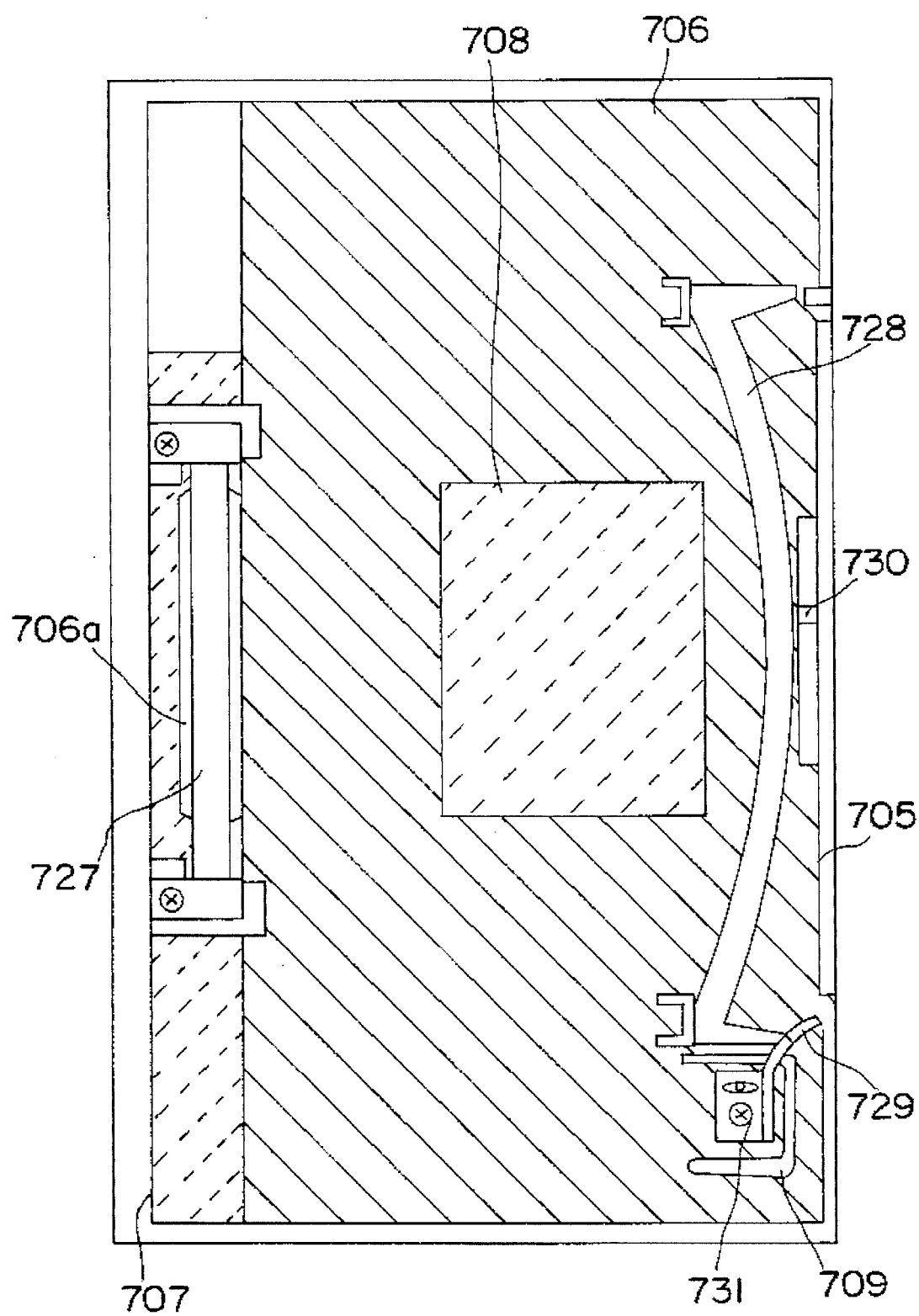
FIG. 10 is a bottom view showing the interior of the optical scanning unit in FIG. 7.
Figure 11:
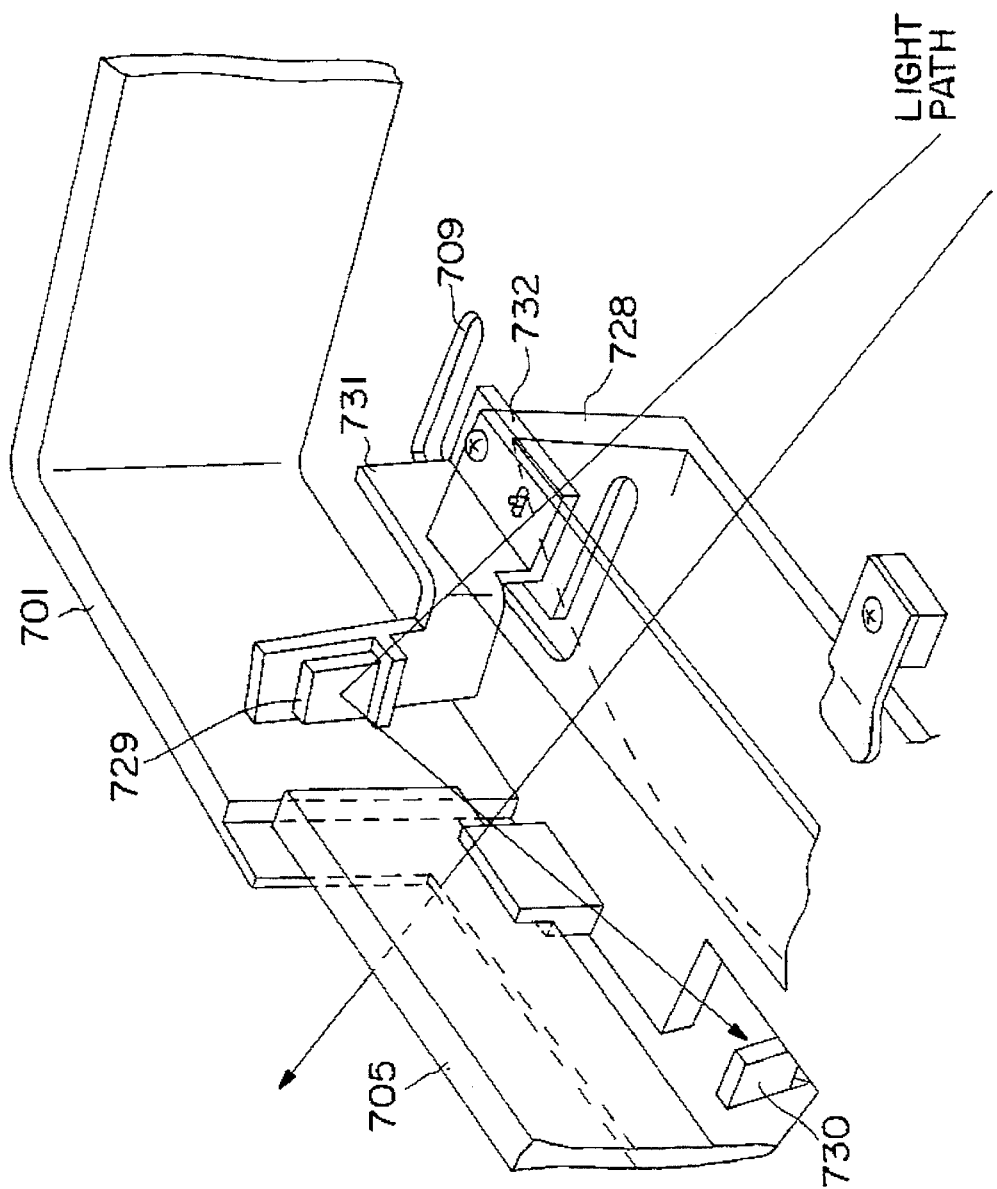
FIG. 11 is a partially detailed diagram of the optical scanning unit in FIG. 9.

FIG. 7 is a perspective view of an optical scanning unit, FIG. 8 is a cross section of the optical scanning unit in FIG. 7, FIG. 9 is a top view showing the interior of the optical scanning unit, FIG. 10 is a bottom view showing the interior of the optical scanning unit, and FIG. 11 is a partially detailed diagram of the optical scanning unit in FIG. 7.

As shown in FIG. 7, the optical scanning unit 7 has a top plate (top frame) 700 on a side frame 701 constituted of four side plates, and a bottom plate (bottom frame) 704. Therefore, the frame of the optical scanning unit 7 forms a shape of a box.

Reinforcing ribs 702 are provided on the front plate of the side frame 701 in the diagram, and likewise reinforcing ribs (not shown) of the same shape as the ribs 702 are provided on the rear plate. Provided under the reinforcing ribs 702 on the front plate is a light window 705 through which scan light leaves. Three mounting blocks 703 are provided on either side plate of the side frame 701 so as to protrude from this side plate.

The electrophotographing apparatus is provided with a pair of plate-shaped body frames 100. The optical scanning unit 7 is placed between the pair of body frames 100 and is attached to those frames 100 by screws N fastened to the mounting blocks 703.

The individual frames 700, 701 and 704 of the optical scanning unit 7 are formed of polycarbonate containing 50% by weight of glass fibers. The body frames 100 are made of an ABB resin. Accordingly, the frames of the optical scanning unit 7 have a higher rigidity than the body frames 100. This reduces deformation of the optical scanning unit 7 which may occur when the optical scanning unit 7 is attached to the body frames 100. It is also possible to reduce deformation of the optical scanning unit caused by deformation of the body frames 100. It is therefore possible to prevent optical components provided in the optical scanning unit 7 from being shifted, thus preventing deviation of the optical path.

Although the material for the frames 700, 701 and 704 of the optical scanning unit 7 differs from the material for the body frames 100 to provide different rigidities, the same can be achieved by changing the thicknesses of those frames.

As the optical scanning unit 7 has a box shape and the body frames 100 are plates, the rigidity of the optical scanning unit is higher than that of the body frames 100. In addition, the reinforcing ribs 702 are provided on the frame 700 of the optical scanning unit 7 to enhance the rigidity.

Further, since the optical scanning unit 7 having a higher rigidity is sandwiched between the body frames 100, the optical scanning unit 7 becomes a stay for the body frames 100 to thereby increase the rigidity of the body frames 100.

Furthermore, there are six screw-fastening points for attachment, three on each side, instead of four points, so that the body frames 100 having a lower rigidity can be reinforced by the optical scanning unit 7. This can ensure the positional precision of the optical scanning unit 7 in the apparatus and can provide a sufficient rigidity.

Moreover, as the mounting blocks 703 are provided protruding from the frame 700 and the body frames 100 are fastened to the mounting blocks 703 by the screws N, the abutting area can be made considerably small, almost a point. It is therefore possible to prevent the deformation of the optical scanning unit 7 and the body frames 100 at the time the optical scanning unit 7 is attached to the body frames 100.

The internal structure of the optical scanning unit 7 will now be described referring to FIGS. 8 through 11.

As shown in FIG. 8, the interior of the optical scanning unit 7 is separated into the upper and lower portions by a support plate (support frame) 706 to form a two-story structure. In the upper side of the optical scanning unit 7, a subframe 707 made of a metal plate having a higher rigidity than the support plate 706 is attached on the support plate 706, as shown in FIGS. 8 and 9. Mounted on this subframe 707 are a semiconductor laser device 720, a collimator lens 721, a cylindrical lens 722, a spindle motor 724 having a polygon mirror 723 attached thereon, a focus lens 725 and an upper reflector 726.

As shown in FIG. 9, a lever 712 having a lever actuating portion 713 is provided on the support plate 706 to be slidable in the right and left directions in the diagram. Provided on the subframe 707 are a shield 710, which is activated by the lever 712 to shield the beam from the semiconductor laser device 720, and a shaft mechanism 711 for the shield 710. As shown in FIG. 8, a light hole 706a is formed in that portion of the subframe 707 which corresponds to the position of the upper reflector 726, so that reflected light from the upper mirror 726 is guided to the lower portion of the optical scanning unit 7.

In the lower side of the optical scanning unit 7, a lower reflector 727 is provided at that position which corresponds to the upper reflector 726 located above the subframe 707, as shown in FIGS. 8 and 10. A focus lens 728 and a start sensor 730 and a light window 705 are provided at the back of the support plate 706. Further, a metal mirror subframe 731 is provided in the vicinity of the focus lens 728 as shown FIGS. 10 and 11. This mirror subframe 731 is provided with a reflector 729 which constitutes part of the start detecting mechanism. A cutaway 709 is formed on the support plate 706 to surround the three sides of the position where the mirror subframe 731 is mounted.

As shown in FIGS. 8 and 10, the support plate 706 is provided with a window 708 through which the subframe 707 is exposed at the position where the spindle motor 724 is mounted.

In the optical scanning unit 7, the subframes 707 and 731 having a higher rigidity than the support plate 706 are provided on the support plate 706, and most of the optical components are mounted on those subframes. Even if the optical scanning unit 7 receives torsional force to deform its frames from the body frames 100, therefore, the optical scanning unit 7 is reinforced by the subframes 707 and 731 having a high rigidity, thus reducing the amount of deformation of the optical scanning unit 7 itself. Even if the frames of the optical scanning unit 7 deform slightly, the deformation on the subframes 707 and 731 is considerably smaller than that of the optical scanning unit 7, thus reducing the deviation of the optical path defined by the optical components.

As the optical elements which influence the alteration of the optical path of the laser beam reaching the start sensor 730, such as the semiconductor laser device 720, collimator lens 721, cylindrical lens 722, polygon mirror 723, spindle motor 724, focus lens 725, and reflectors 726, 727 and 729, are provided on the subframes 707 and 731, the aforementioned deviation of the optical path can be minimized.

Although the focus lens 728 and the start sensor 730 are not provided on the subframes 707 and 731, the provision of the aforementioned optical elements on the subframes 707 and 731 suffice to prevent the deviation of the optical path to the start sensor 730. If the focus lens 728 and start sensor 730 are provided on the subframe 707 or 731, the alteration of the optical path can be prevented more surely.

As the spindle motor 724 whose rotation generates vibration is mounted on the subframe 707 having a high rigidity, it is possible to prevent this vibration from being transmitted to the optical scanning unit 7 and thus prevent the optical scanning unit 7 from vibrating. This prevents the relative position of the optical scanning unit 7 to the photosensitive drum 40 from shifting, thus preventing the occurrence of printing disturbance.

The difference in rigidity between the frame 706 of the optical scanning unit 7 and the subframes 707 and 731 thereof is provided by forming the frame 706 of the same resin as the frame 700 and forming the subframes 707 and 731 of metal. Alternatively, the difference in rigidity can also be given by forming the frame 706 and the subframes 707 and 731 of the same material and changing their thicknesses, changing the number of the ribs or changing the cross-sectional area of the ribs.

The reflector 729 for adjusting the start detecting position is mounted on the mirror subframe 731, not on the subframe 707. This mirror subframe 731 is so designed that its position can be adjusted through a guide hole 732 as shown in FIG. 11. Accordingly, this adjustment can be accomplished by a special jig as used in a factory or the like and the adjusting mechanism is not mounted on the subframes 707 and 731, the masses of the subframes can be reduced.

The mirror subframe 731 which affects the start detection finally is provided on the support plate 706 with the C-shaped cutaway 706. Even if the frame 706 deforms, therefore, the deformation of the subframe 731 is reduced by the cutaway 709.

The support plate 706 is provided with the window 708, a portion which does not support the subframe 707, so that part of the support plate 706 has a floating structure. Even if the frames of the optical scanning unit 7 deform due to the torsion of the body frames 100, therefore, the influence of the torsion can be reduced to prevent the deformation of the subframe 707.

The deformation of the optical scanning unit 7 is suppressed even when the optical scanning unit 7 receives deformation force from the body frames 100 externally applied and the optical elements are not be influenced by the possible deformation of the frames of the optical scanning unit 7 in the above-described manner, thus minimizing the deviation of the optical path and ensuring the start detection.

When the covers of the apparatus are open, the laser beam may leak from the optical scanning unit 7, which is dangerous to a human body. It is therefore necessary to provide a mechanism which shields the laser beam in the optical scanning unit 7 when the covers of the apparatus are open. The light shielding mechanism whose function interlocks with the opening of the covers is disclosed in, for example, Japanese Unexamined Patent Publication No. 165775/1986. In the case of the electrophotographing apparatus as shown in FIG. 2, however, there are two covers, the front cover 10 and upper cover 11, so that a special structure becomes necessary.

Figure 12:
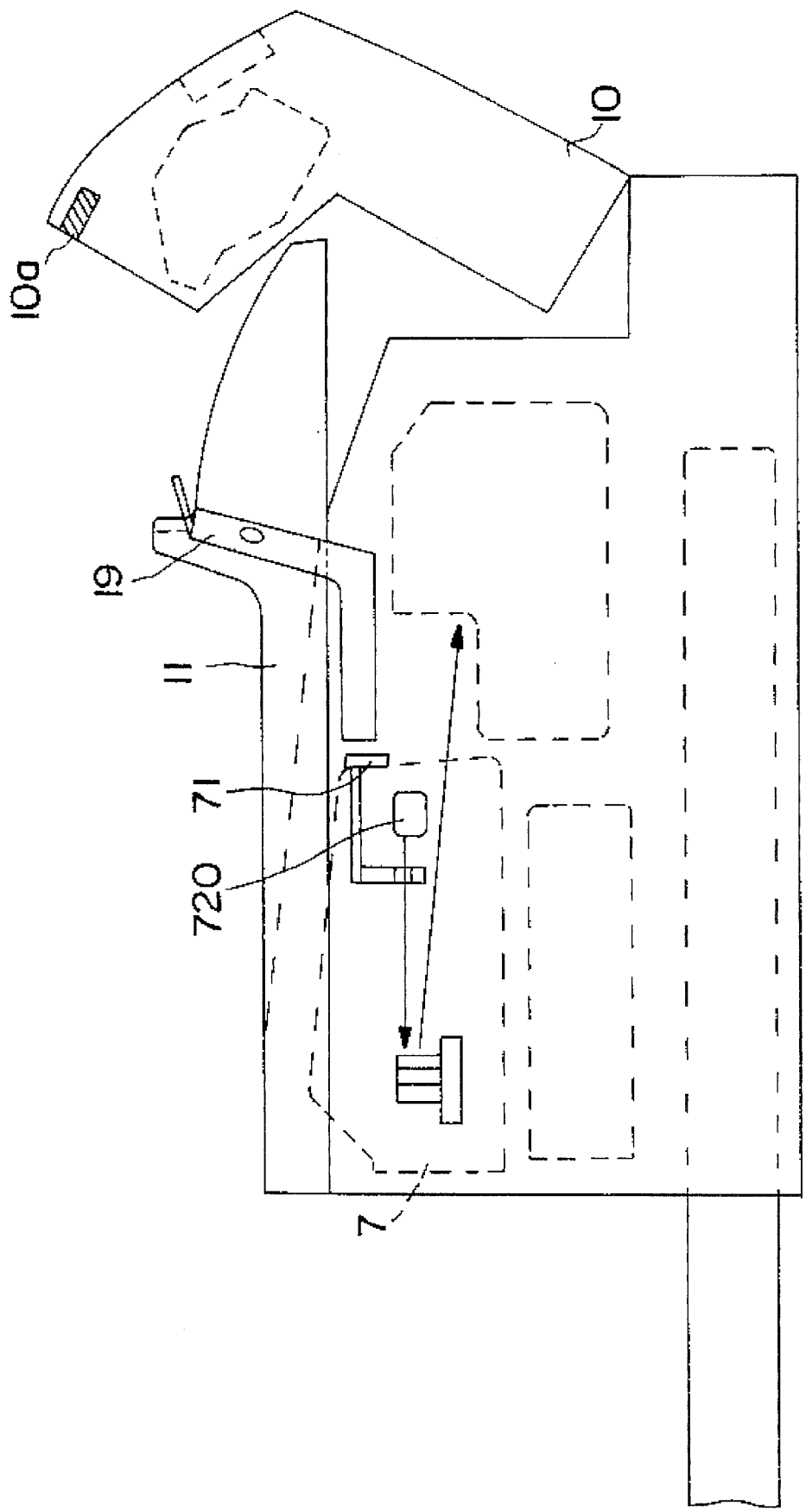
FIG. 12 is an explanatory diagram of a light shielding mechanism with the covers of the apparatus opened.
Figure 13:
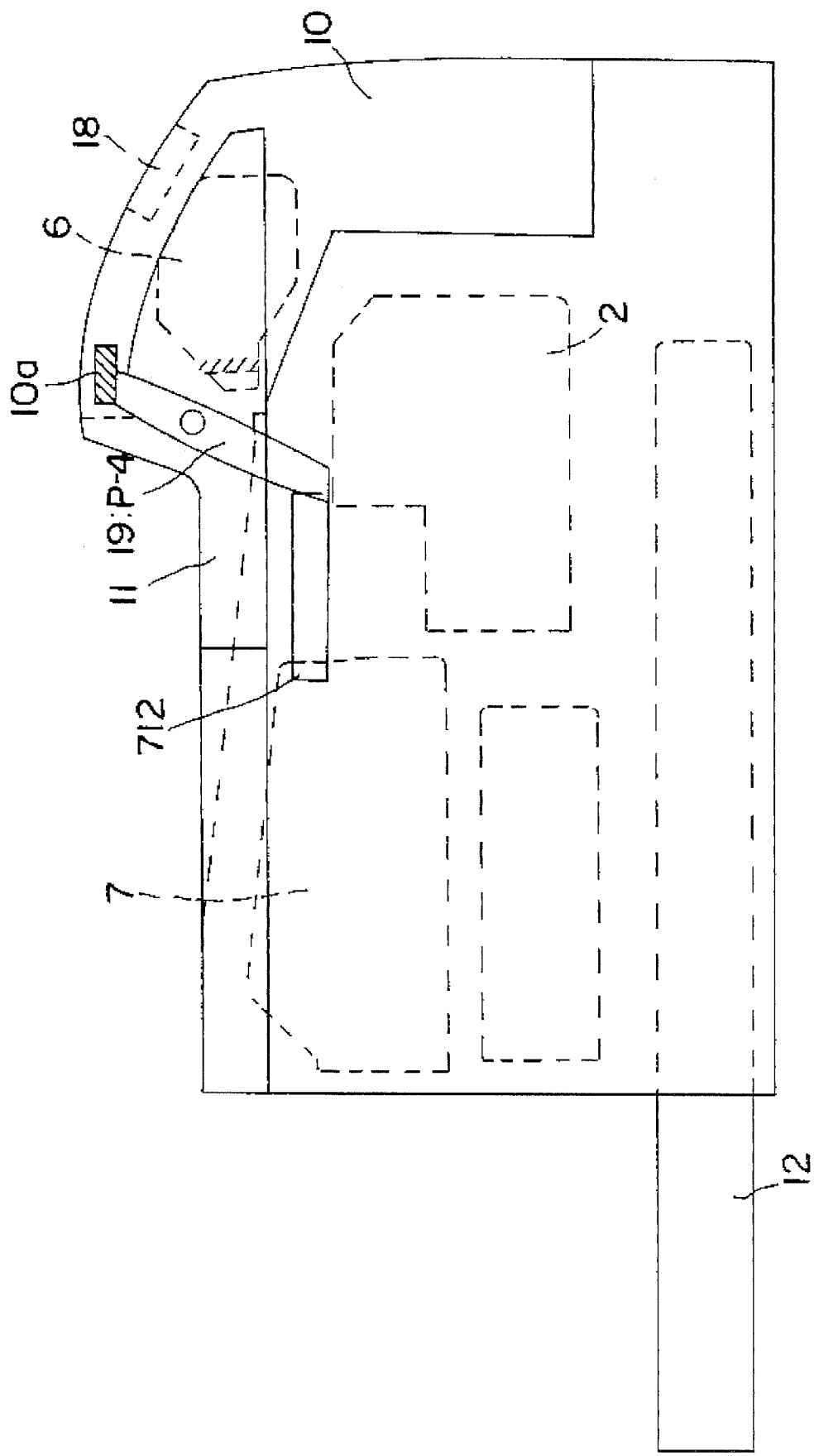
FIG. 13 is an explanatory diagram of the light shielding mechanism with the covers of the apparatus closed.
Figure 14:
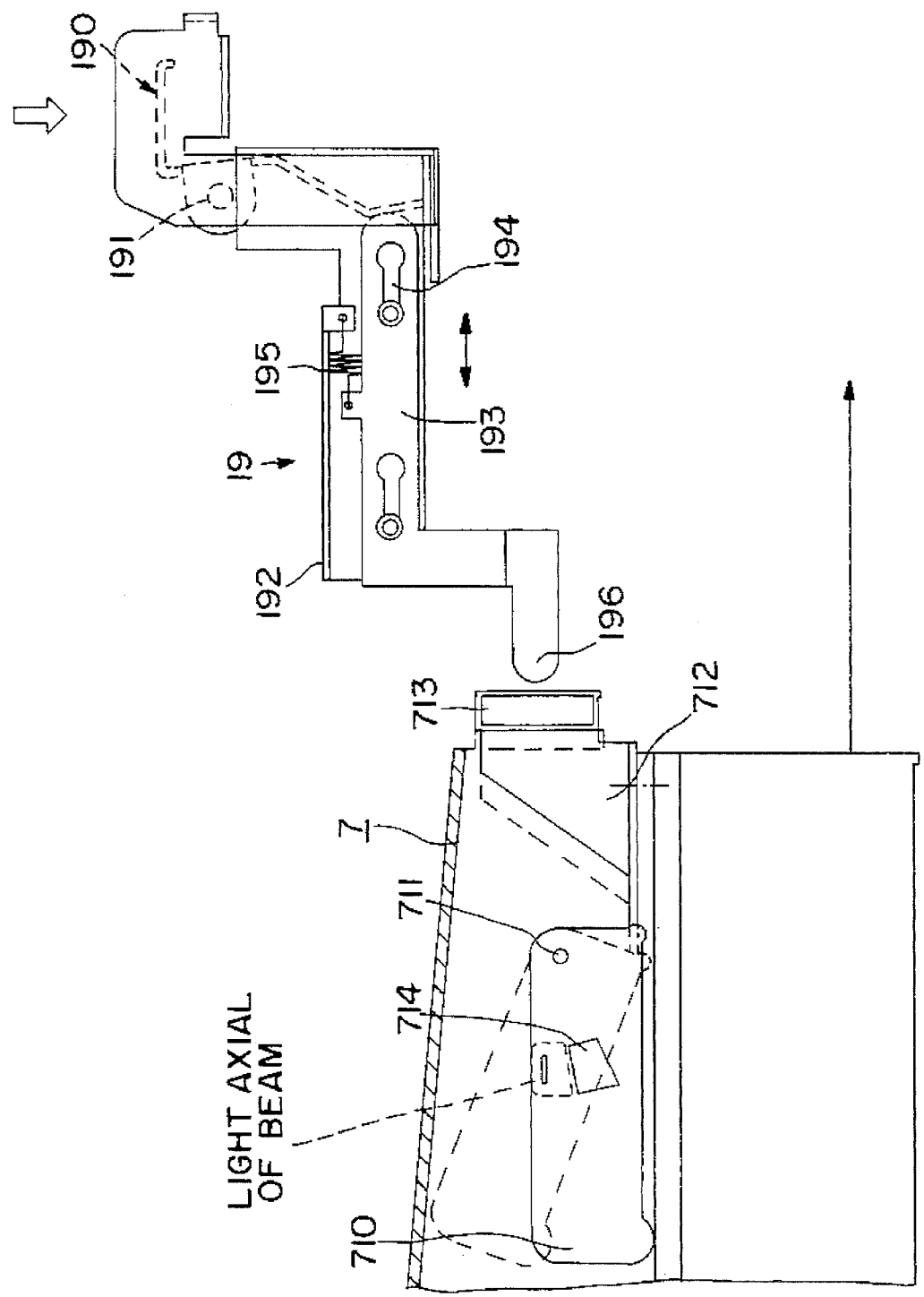
FIG. 14 is a diagram showing the structure of the light shielding mechanism.
Figure 15:
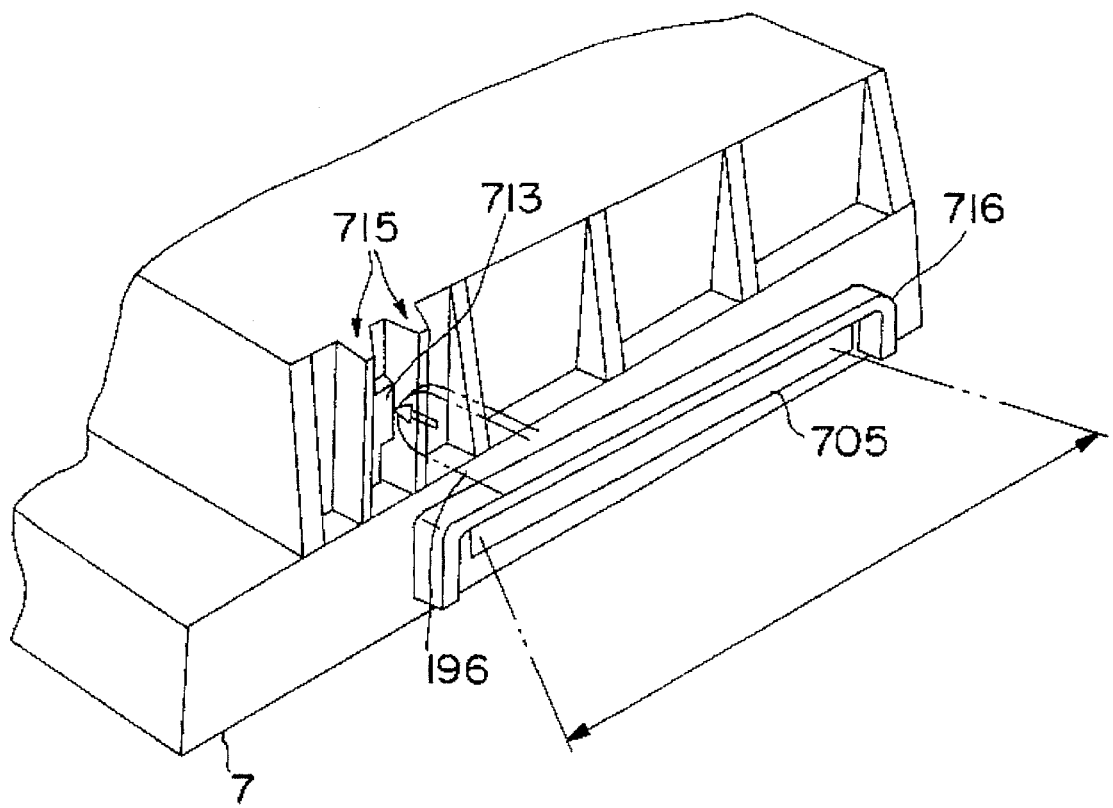
FIG. 15 is an explanatory diagram of a lever actuating portion of the light shielding mechanism.
Figure 16:
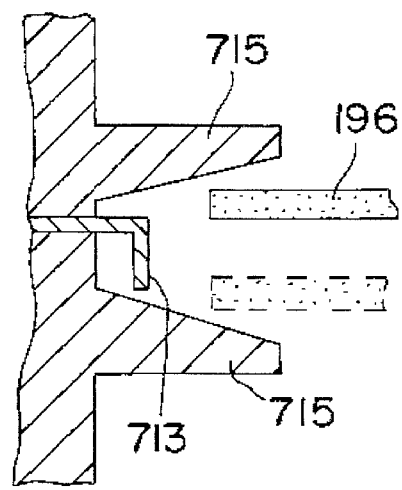
FIG. 16 is an explanatory diagram of the lever actuating portion and ribs of the light shielding mechanism.

FIG. 12 is an explanatory diagram of a light shielding mechanism with both covers of the apparatus opened, FIG. 13 is an explanatory diagram of the light shielding mechanism with both covers of the apparatus closed, FIG. 14 is a diagram showing the detailed structure of the light shielding mechanism, FIG. 15 is a perspective view of ribs of the light shielding mechanism, and FIG. 16 is a cross-sectional view of the rib of the light shielding mechanism.

As shown in FIG. 12, the front cover 10 is provided with a projection 10a, while the upper cover 11 is provided with an arm mechanism 19 which is constituted of a link mechanism. The left-hand end of the arm mechanism 19 faces the lever actuating portion 713 of the optical scanning unit 7 shown in FIG. 9.

As shown in FIG. 14, the arm mechanism 19 has an arm base 192 attached to the upper cover 11, an arm 193 attached to the arm base 192 to be slidable in a slide hole 194, and a tension spring 195 for pulling the arm 193 rightward in the diagram.

The arm 193 has an arm end 196 (left-hand end) located to face the lever actuating portion 713 of the lever 712 of the optical scanning unit 7. The right-hand end of the arm 193 abuts on the lower end of a rotational lever 190 which rotates around a fulcrum 191.

The optical scanning unit 7 is provided with the beam shield 710 shown in FIG. 9. As shown in FIG. 14, the beam shield 710 located in front of the semiconductor laser device 720 is provided with a beam hole 714. The beam shield 710 is rotatable around the shield shaft 711. The distal end of the aforementioned slidable lever 712 is linked to the beam shield 710 so as to push the lower end of the beam shield 710.

The action of the light shielding mechanism will now be described. As shown in FIGS. 5 and 6B, when the upper cover 11 and front cover 10 are open, the arm mechanism 19 of the upper cover 11 is detached from the optical scanning unit 7. As a result, the lever actuating portion 713 of the lever 712 becomes free as shown in FIGS. 12 and 14. The beam shield 710 is designed in such a way that the left-hand portion with the hole 714 as the center is longer than the right-hand portion. Accordingly, the beam shield 710 comes to the position of the solid line due to its dead weight as shown in FIG. 14, and the beam hole 714 comes off the beam axis of the semiconductor laser device 720, so that the laser beam from the semiconductor laser device 720 is shielded by the beam shield 710.

When the upper cover 11 is closed in this condition as shown in FIG. 6A, the arm end 196 of the arm 193 of the arm mechanism 19 comes in front of the lever actuating portion 713 of the lever 712 of the optical scanning unit 7, as shown in FIGS. 12 and 14.

When the front cover 10 is closed in this state as shown in FIG. 13, the projection 10a of the front cover 10 pushes the upper portion of the rotational lever 190. Consequently, the rotational lever 190 rotates clockwise around the fulcrum 191, causing the arm 193 to slide leftward in the diagram against the tensile force of the tension spring 195.

As a result, the end 196 of the arm 193 pushes the lever actuating portion 713 of the lever 712, sliding the lever 712 leftward to the position indicated by the broken line in the diagram. The beam shield 710 rotates clockwise around the shaft 711. Consequently, the beam hole 714 of the beam shield 710 comes in line with the beam axis of the semiconductor laser device 720 so that the beam from the semiconductor laser device 720 passes through the beam hole 714 to be irradiated on the cylindrical lens 722.

When the front cover 10 is open, on the other hand, the pressure of the projection 10a of the front cover 10 on the upper portion of the rotational lever 190 is released. The arm 193 therefore moves rightward in the diagram due to the tensile force of the tension spring 195, causing the rotational lever 190 to rotate counterclockwise to the original position.

At the same time, the pressure of the end 196 of the arm 193 on the lever actuating portion 713 of the lever 712 is released, so that the beam shield 710 rotates counterclockwise around the shaft 711 to come to the position of the solid line due to the dead weight. As a result, the beam hole 714 comes off the beam axis of the semiconductor laser device 720, permitting the beam shield 710 to shield the laser beam from the semiconductor laser device 720.

When the front cover 10 alone is closed with the upper cover 11 left open, the arm 193 does not come to the position shown in FIG. 14, so that the lever 712 will not be actuated. Accordingly, the laser beam from the semiconductor laser device 720 is kept shielded by the beam shield 710.

In the case where the two covers 10 and 11 are provided to increase the open space, when only one cover is closed, the other cover is left open. This permits the laser beam to leak, which is dangerous to a human body. Therefore, the shielding of the laser beam is maintained when only one cover is closed, and the beam shielding is released only when both covers 10 and 11 are closed, thus ensuring safe conditions.

Further, the structure as shown in FIGS. 15 and 16 is employed so as to prevent the lever 712 from being pushed by an erroneous manipulation even when both covers 10 and 11 are open.

As shown in FIG. 15, a pair of erroneous-manipulation preventing ribs 715 are provided on both sides of that position of the frame 700 where the lever actuating portion 713 of the lever 712 of the optical scanning unit 7 pushes. The gap between those ribs 715 is made narrower than the width of a human finger. Even with both covers 10 and 11 open, therefore, it is possible to prevent a user from pushing the lever actuating portion 713 erroneously or by accident, thus releasing the beam shielding, when the user puts his or her hand into the apparatus to operate the process cartridge 2 or the like. Further, the ribs 715 reinforce the frame 700 to prevent its deformation.

The ribs 715 are formed so as to make the space therebetween narrower toward the lever actuating portion 713 of the lever 712 from the arm end 196 as shown in FIG. 16 for the following reason. The optical scanning unit 7 is mounted on the body frames 100 and the arm mechanism 19 is attached to the upper cover 11, the relative position of the former to the latter is not constant due to a size error or the like. Therefore, the rib pair 715 are formed to guide the end 196 of the arm mechanism 19 along the surfaces of the ribs 715 so that the arm end 196 pushes the lever actuating portion 713 of the lever 712, as shown in FIG. 16.

As shown in FIG. 15, a light-window protecting rib 716 is formed integral with the frame 700 in the vicinity of the light window 705. This rib 716 prevents the user's fingers from accidentally touching the light window 705 and prevent any falling material, such as dust or a developer, from sticking to the light window 705 as well as prevents the deformation of the frame 700. Further, the light window 705 is made of a transparent resin, which follows up a change in the ambient temperature better than glass and does not cause dew condensation, thus preventing scattering of the transmitted light. As the frame 700 is also made of a resin, its coefficient of thermal expansion is close to that of the light window 705, preventing partial interference due to thermal deformation.

In addition to the above-described embodiments, the present invention may be modified as follows. First, although the optical scanning mechanism described is a polygon mirror, other scanning means such as hologram, can be employed as well. Secondly, the type of sheets are not limited to paper, and other media may be used as well. Thirdly, although the image forming apparatus has been explained as a printer, it may be another type of electrophotographing apparatus, such as a copying machine or facsimile. Fourthly, the photosensitive body is not limited to a drum, but may be another endless type, such as an endless belt-shaped body. Further, the charging means is not limited to a charging roller, but may be a corotron or the like.

In short, according to the present invention, the rigidity of the frames of the optical scanning unit is made higher than that of the body frames to which the optical scanning unit is attached. It is therefore possible to prevent the body frame side from deforming by the deformation force applied when the optical scanning unit is attached to the body frames, thus preventing the deformation of the optical scanning unit as well as the deviation of the optical path. Further, the strain on the body frames will not deform the optical scanning unit, thus preventing the deviation of the optical path.

What is claimed is:

1. An image forming apparatus comprising:

an endless photosensitive body;

charging means for charging the photosensitive body;

an apparatus frame having a rigidity;

an optical scanning unit for exposing the photosensitive body to light, including a light source, an optical scanning mechanism for scanning with light from the light source, a start detecting mechanism for detecting scan light of the optical scanning mechanism at an end portion of a scanning range of the scan light to detect beginning of light scanning, a frame which the light source, the optical scanning mechanism and the start detecting mechanism are attached and which is secured to the apparatus frame, and reinforcing means provided with the frame of the optical scanning unit for reinforcing the frame of the optical scanning unit to have a higher rigidity than that of the apparatus frame so that the frame of the optical scanning unit is not deformed when the frame of the optical scanning unit is secured to the apparatus frame, the frame of the optical scanning unit having two sides;

means for fastening said optical scanning unit to said apparatus frame;

a developing unit for developing an electrostatic latent image formed on the photosensitive body by light exposure by the optical scanning unit; and a transfer unit for transferring a toner image on the photosensitive body onto a sheet.

2. The image forming apparatus according to claim 1, wherein the box of the optical scanning unit comprises:

a pair of side plates attached to the apparatus frame;

front and rear plates to which the pair of side plates are connected;

top and bottom plates to which the pair of side plates are connected; and a mounting plate provided between the top and bottom plates and having a higher rigidity than those of the front, rear, top and bottom plates, the light source, the optical scanning mechanism and the start detecting mechanism being mounted on the mounting plate.

3. The image forming apparatus according to claim 1, wherein the box further comprises a plurality of mounting blocks provided on surfaces said pair of side plates attached to the apparatus frame by screws.

4. The image forming apparatus according to claim 2, wherein the box of the optical scanning unit further comprises a support plate, provided on the pair of side plates, for supporting the mounting plate, a window being formed in that portion of the support plate which is at a mounting position of the optical scanning mechanism on the mounting plate.

5. The image forming apparatus according to claim 1, wherein the box of the optical scanning unit comprises:

a pair of side plates to be attached to the apparatus frame;

front and rear plates to which the pair of side plates are connected;

top and bottom plates to which the pair of side plates are connected;

a mounting plate provided between the top and bottom plates and having a higher rigidity than those of the front, rear, top and bottom plates, the light source and the optical scanning mechanism being mounted on the mounting plate;

a submounting plate on which the start detecting mechanism is mounted; and an attaching member for adjustably attaching the submounting plate to the mounting plate.

6. The image forming apparatus according to claim 5, wherein a box of the optical scanning unit further comprises a supporting plate, provided on the pair of side plates, for support the mounting plate, a window being formed in that portion of the support plate which is at the mounting position of the optical scanning mechanism on the mounting plate.

7. The image forming apparatus according to claim 1, further comprising:

a light shielding mechanism, provided between the light source and the optical scanning mechanism of the optical scanning unit, shielding light from the light source;

a first apparatus cover having an action transmitting mechanism operating the light shielding mechanism; and a second apparatus cover having an actuating member activating the action transmitting mechanism.

8. The image forming apparatus according to claim 7, wherein:

the action transmitting mechanism is a rotatable lever mechanism; and the actuating member is a projection for rotating the lever mechanism.

9. The image forming apparatus according to claim 7, wherein the light shielding mechanism comprises a lever movable between a light shielding position to shield the light from the light source and a light passing position to pass the light therefrom, and a lever actuating portion provided on the lever and protruding from the optical scanning unit to be engaged with the action transmitting mechanism, the lever actuating portion having two sides.

10. The image forming apparatus according to claim 9, wherein the box of the optical scanning unit has a pair of ribs provided on the two sides of the lever actuating portion.

11. The image forming apparatus according to claim 10, wherein the the pair of ribs on the two sides of the lever actuating portion has a guide surface on an internal surface for guiding the action transmitting mechanism.

12. The image forming apparatus according to claim 8, wherein the light shielding mechanism comprises a lever movable between a light shielding position to shield the light from the light source and a light passing position to pass the light therefrom, and a lever actuating portion provided on the lever and protruding from the optical scanning unit to be engaged with the action transmitting mechanism, the lever actuating portion having two sides.

13. The image forming apparatus according to claim 12, wherein the box of the optical scanning unit has a pair of ribs provided on the two sides of the lever actuating portion.

14. The image forming apparatus according to claim 13, wherein the pair of ribs on the two sides of the lever actuating portion has a guide surface on an internal surface for guiding the action transmitting mechanism.

* * * * *

UNITED STATES PATENT AND TRADEMARK OFFICE
CERTIFICATE OF CORRECTION

PATENT NO. : 5,539,447
DATED : July 23, 1996
INVENTOR(S) : Tomokazu AKUTA et al.

It is certified that error appears in the above-indentified patent and that said Letters Patent is hereby corrected as shown below:

Title Page, [75], line 4, change "Inagi" to --Tokyo--;

Column 1, line 54, delete "Optical" and insert --optical--.

Column 7, line 63, delete "individual"; and line 66, delete "ABB" and insert --ABS--.

Column 1, line 54, delete "Optical" and insert --optical--.

Column 7, line 63, delete "individual"; and line 66, delete "ABB" and insert --ABS--.

Signed and Sealed this

Twenty-fourth Day of December, 1996

*Attest:*

BRUCE LEHMAN

*Attesting Officer*     *Commissioner of Patents and Trademarks*